(12) United States Patent
Allman

(10) Patent No.: US 10,519,994 B2
(45) Date of Patent: Dec. 31, 2019

(54) MOUNTING ARRANGEMENT

(71) Applicant: ASG GROUP LTD, Alvaston, Derbyshire (GB)

(72) Inventor: Peter Neville Allman, Alvaston (GB)

(73) Assignee: ASG Group LTD, Alvaston, Derby (GB)

(*) Notice: Subject to any disclaimer, the term of this patent is extended or adjusted under 35 U.S.C. 154(b) by 60 days.

(21) Appl. No.: 15/561,941

(22) PCT Filed: Mar. 22, 2016

(86) PCT No.: PCT/GB2016/050790
§ 371 (c)(1),
(2) Date: Sep. 26, 2017

(87) PCT Pub. No.: WO2016/151312
PCT Pub. Date: Sep. 29, 2016

(65) Prior Publication Data
US 2018/0112694 A1 Apr. 26, 2018

(30) Foreign Application Priority Data
Mar. 26, 2015 (GB) .................................. 1505090.9

(51) Int. Cl.
*F16M 13/00* (2006.01)
*F16B 5/02* (2006.01)
*B60R 21/02* (2006.01)

(52) U.S. Cl.
CPC ............ *F16B 5/025* (2013.01); *B60R 21/026* (2013.01)

(58) Field of Classification Search
CPC ... F16M 11/14; F16M 11/2078; F16C 11/106; F16C 11/06; B60R 2011/0089

USPC .......... 248/227.1, 228.1, 230.1, 340, 288.31, 248/322, 339
See application file for complete search history.

(56) References Cited

U.S. PATENT DOCUMENTS 1,487,892 A * 3/1924 Ryden ..................... F21V 21/02
174/62
2,882,005 A * 4/1959 Ramsing ................. F21V 21/02
248/343
(Continued)

FOREIGN PATENT DOCUMENTS

DE      202013006889 U1   9/2013
GB          2206548 A     1/1989
WO   WO-2007036761 A1 *   4/2007   ......... B60R 11/0241

OTHER PUBLICATIONS

International Search Report & Written Opinion dated May 30, 2016 for PCT Application No. PCT/GB2016/0560790, 9 pages.

*Primary Examiner* — Steven M Marsh
(74) *Attorney, Agent, or Firm* — Han Santos, PLLC (57) ABSTRACT

A mounting arrangement 10 for mounting a dog guard 12 in a vehicle. The mounting arrangement 10 includes a bracket part 22 mountable to the dog guard 12. The bracket part 22 includes an opening 30 with a concave contact surface 34 around the opening 30. A fixing member 36 is provided threadably mountable to the end of a bar 52 which extends through the opening 30. The fixing member 36 has a sleeve 44 with a lower convex annular contact surface 48 engageable against the bracket part contact surface 34. The other end of the bar 52 is engageable with for instance a fixing hook provided on the floor of the boot of a car.

17 Claims, 12 Drawing Sheets

(56) References Cited

U.S. PATENT DOCUMENTS 5,851,107 A * 12/1998 Wang .................. F04D 25/088
                                                          416/244 R
7,726,945 B2 * 6/2010 Grant .................. F04D 25/088
                                                          416/134 R

* cited by examiner

MOUNTING ARRANGEMENT

This invention concerns a mounting arrangement, and particularly but not exclusively a mounting arrangement for mounting a dog guard, cargo barrier or other structure in a car or other vehicle.

Dog guards and cargo barriers are widely used in cars to divide off the back of an estate or hatchback car from the remainder of the car, to restrain a load or one or more dogs in the boot area. Conventionally, such guards locate behind the rear seats, immediately behind the rear headrests.

Such dog guards require secure mounting in a car, and generally require a mounting to an appropriate fixing in the boot. Appropriate fixing points are provided at different positions in different vehicles, and this usually means a specific mounting arrangement is required for each type of vehicle.

According to a first aspect of the invention there is provided a mounting arrangement for mounting an item to a fixture, the arrangement comprising a bracket part mountable to the item, the bracket part including an opening through which an end of an elongate member can extend, with the other end of the elongate member mountable to the fixture, the bracket part including a curved at least generally concave contact surface surrounding an upper end in use of the opening, a fixing member engageable with the elongate member, the fixing member having a curved at least generally convex contact surface engageable against the bracket part contact surface in a ball and socket configuration, such that the relative alignment between the bracket part, and fixing member and hence elongate member, can be varied.

The fixing member may be threaded so as to be threadingly engageable with the elongate member. A through opening may be provided in the fixing member through which an end of the elongate member is extendable, and at least part of the through opening may be threaded.

The mounting arrangement may include an elongate member, which elongate member may have a threaded first end. The elongate member may have a formation on a second end, which formation is engageable with a further formation, structure or item. In one embodiment the formation comprises a hook, whilst in a further embodiment the formation includes an opening through which a further formation or item can extend.

The bracket part may include a mounting part locatable in an opening or recess in the item to mount the bracket part on the item. A fastening means may be engageable with the mounting part to retain the arrangement on the item, and the arrangement may include a fastening means, which may comprise a self-tapping or thread rolling screw.

The elongate member may be in the form of a bar which is threaded at least at one end. The elongate member may be variable in length.

According to the second aspect of the invention there is provided a mounting arrangement for mounting a dog guard on a vehicle, the arrangement being according to any of the preceding five paragraphs.

An embodiment of the present invention will now be described by way of example only and with reference to the accompanying drawings, in which:—

The drawings show a mounting arrangement 10 for mounting a dog guard 12 in a vehicle. The dog guard 12 comprises an external frame 14 profiled to locate behind the rear seats of a vehicle so as to close the gap relative to the side walls/windows and also roof of the vehicle. The frame 14 comprises a profiled hollow oval cross-section frame member 16 including an in use horizontal base part 18. Extending between the parts of the frame member 16 an open wire mesh 20 is provided.

The dog guard 12 has a pair of adjustable arms 21 on each side for engagement with different parts of the vehicle, dependent on the location and profile of these parts. Such arms 21 are conventional and will not therefore be described in any further detail.

Figure 1:
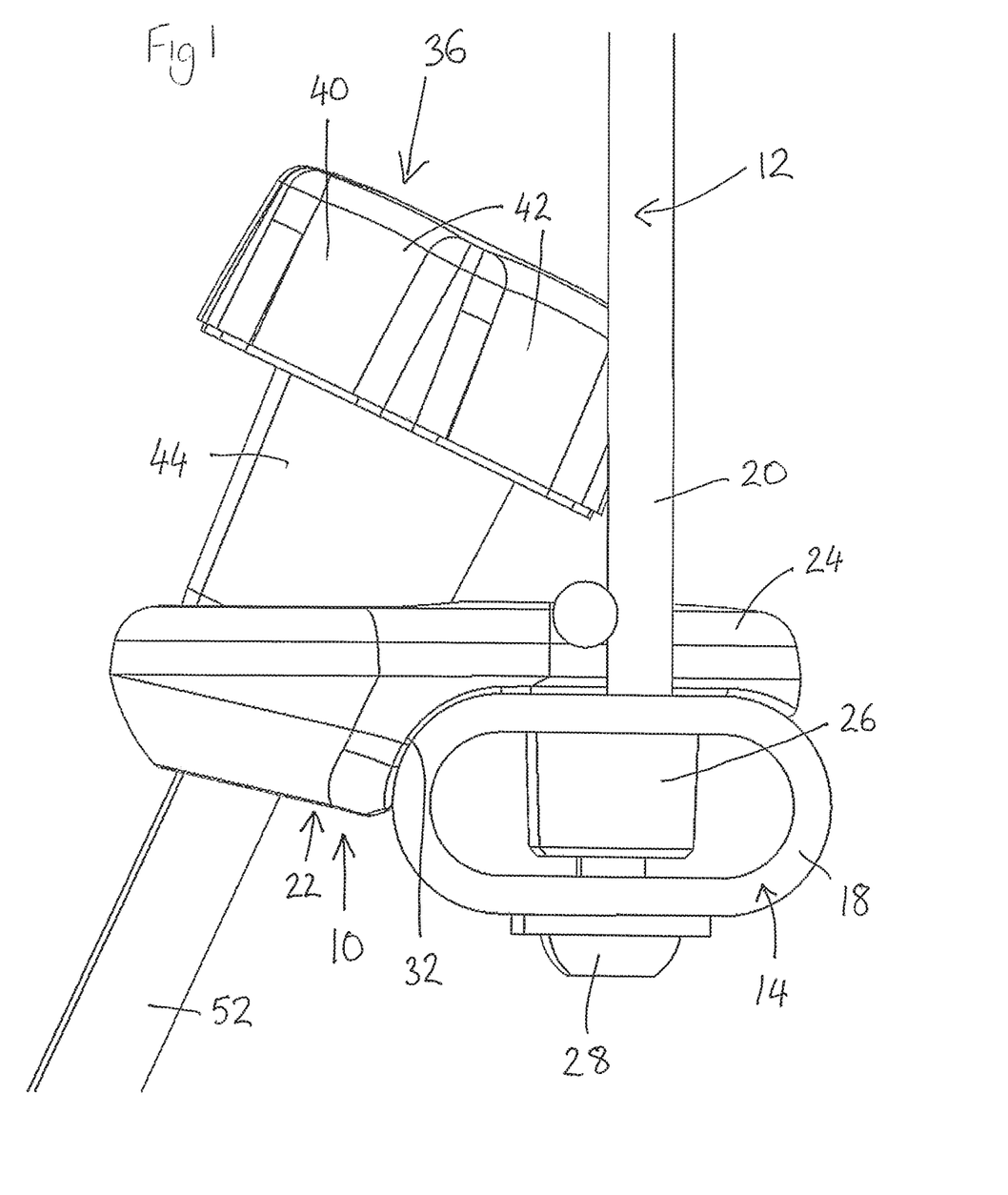
FIG. 1 is a diagrammatic side view of a part of a mounting arrangement according to the invention in use.
Figure 2:
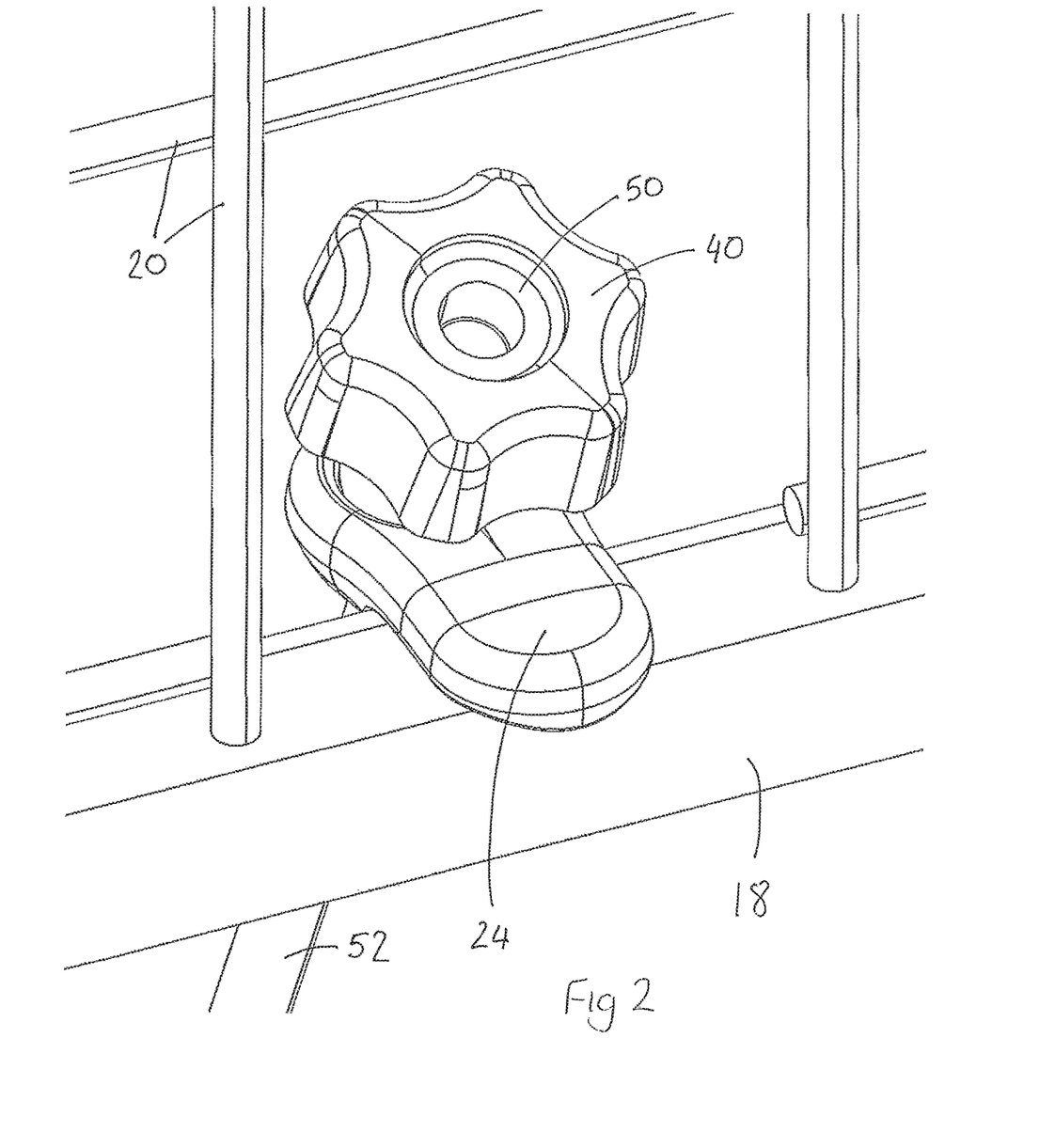
FIG. 2 is a diagrammatic perspective view from above of the part of the arrangement of FIG. 1.
Figure 3:
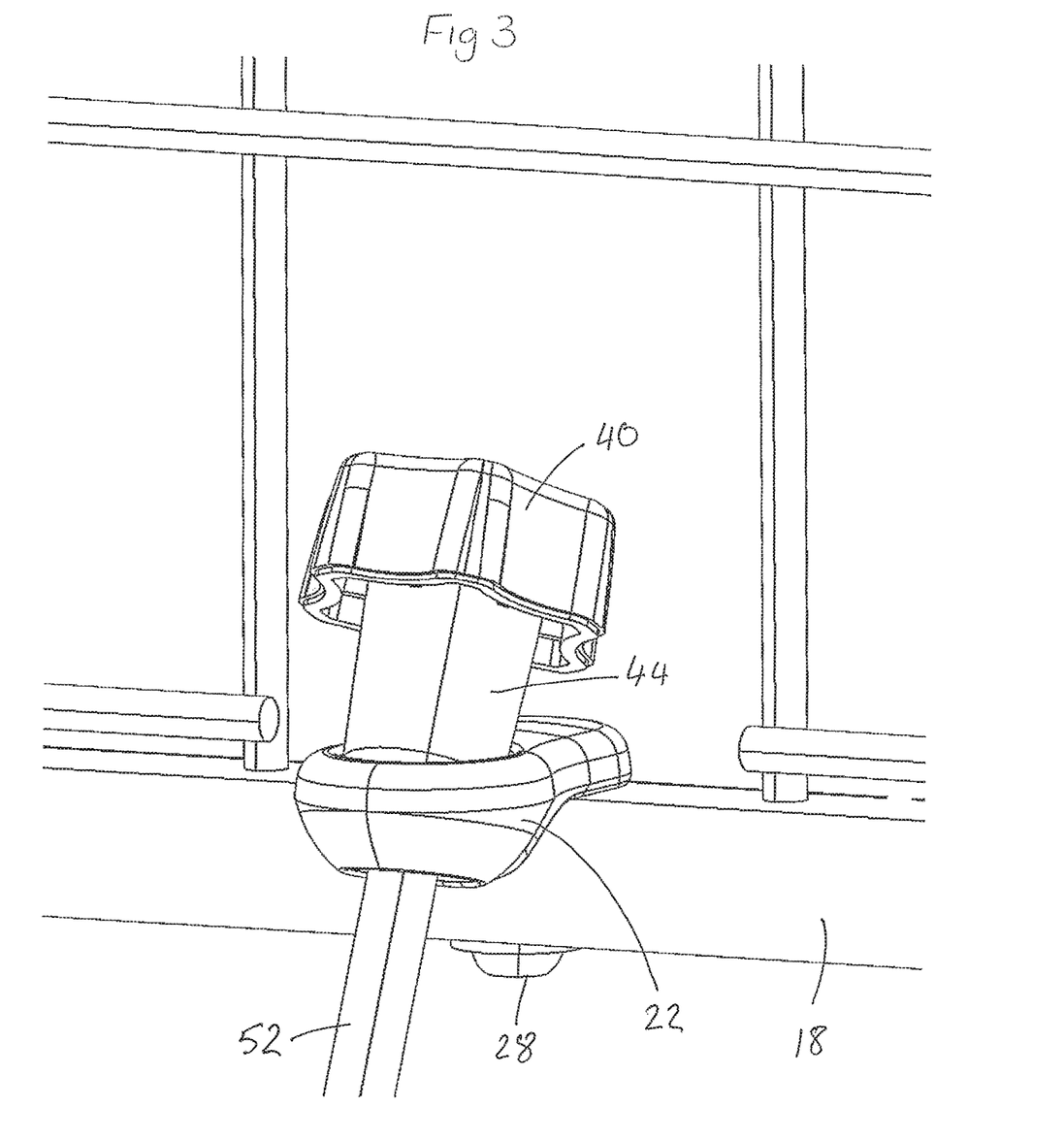
FIG. 3 is a diagrammatic perspective view from a side of the part of the arrangement of FIG. 1.
Figure 4:
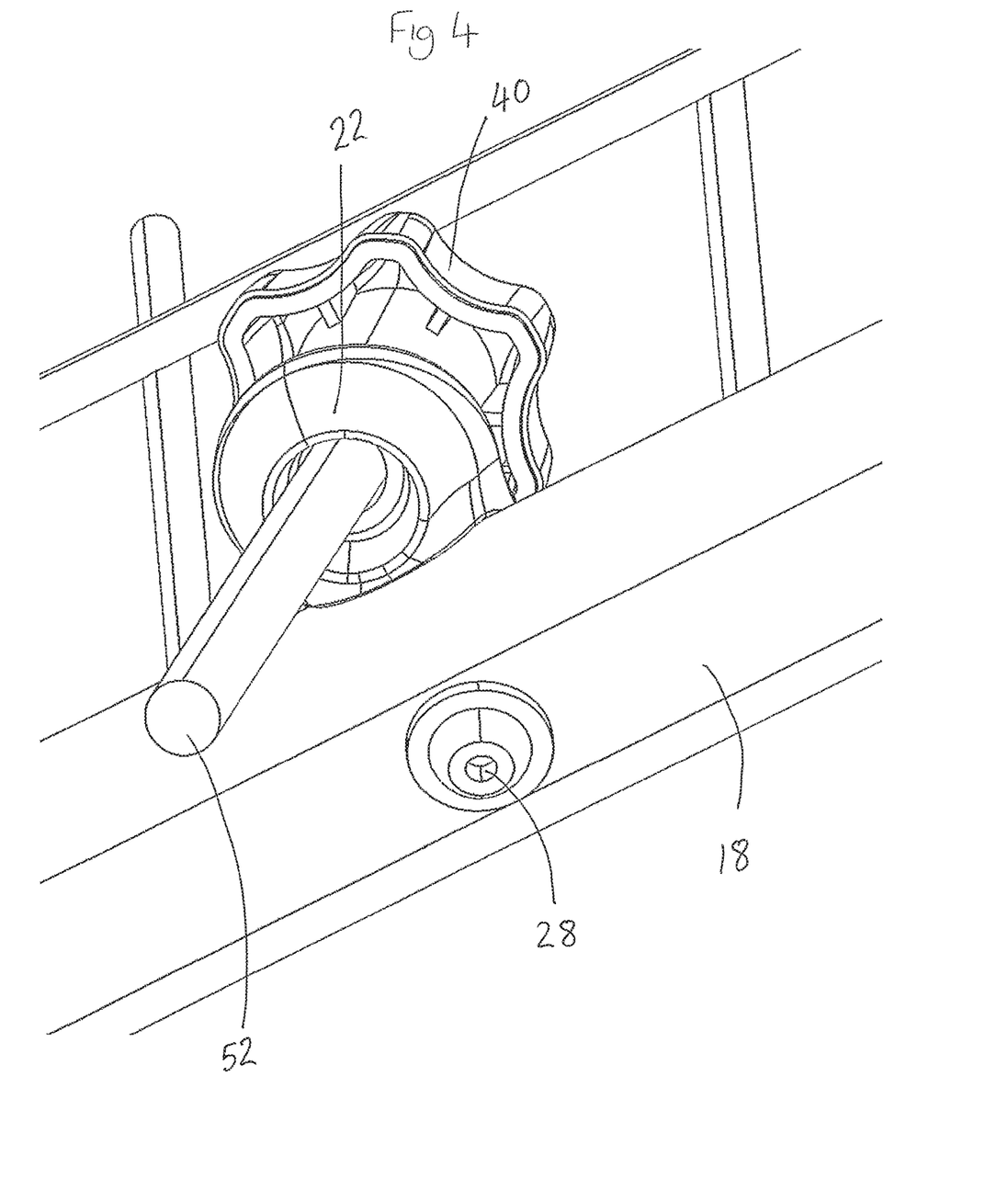
FIG. 4 is a diagrammatic perspective view from below of the part of the arrangement of FIG. 1.
Figure 5:
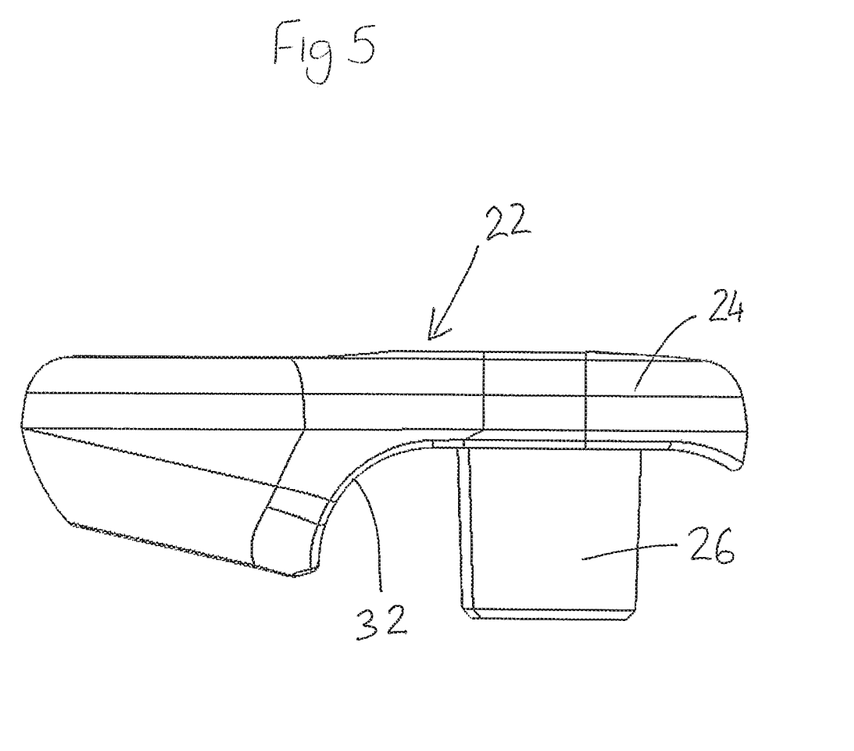
FIG. 5 is a diagrammatic side view of a first component of the arrangement of FIG. 1.
Figure 6:
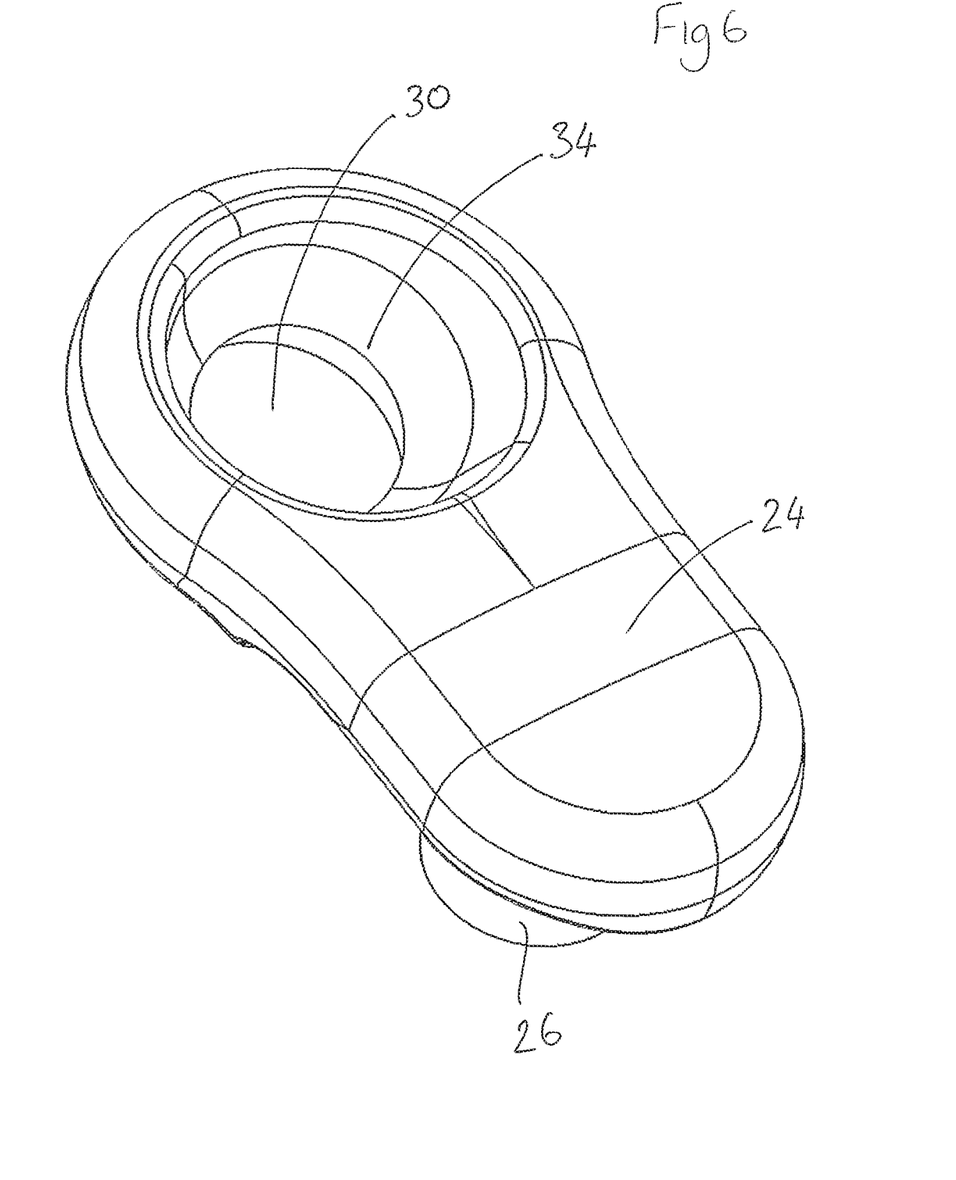
FIG. 6 is a diagrammatic perspective view from above of the component of FIG. 5.
Figure 7:
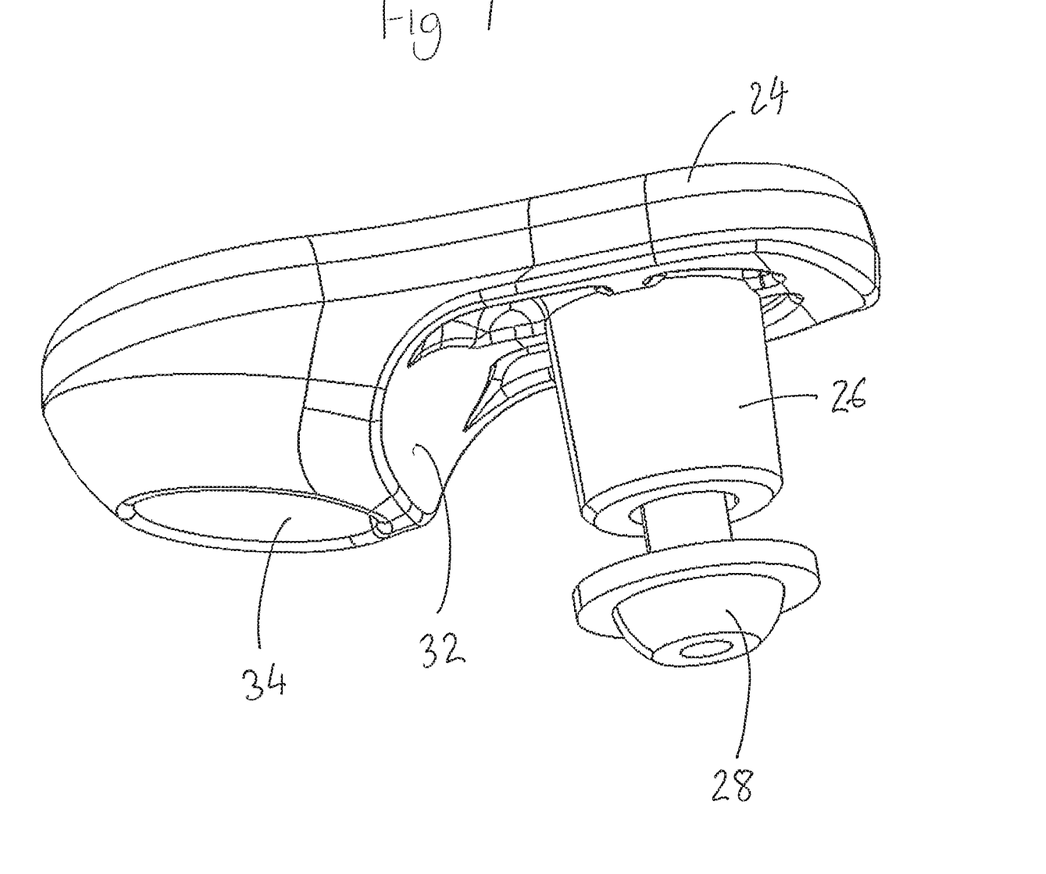
FIG. 7 is a diagrammatic perspective view from below of the component of FIG. 5 and a further component.

The mounting arrangement 10 includes a bracket part 22 which may be in the form of a profiled plastics material moulding. The bracket part comprises a planar part 24 locatable on a part of the base part 18. A downwardly extending boss 26 is provided extending from the planar part 24, and the boss 26 slidingly extends through an opening provided in the base part 18 so as to terminate within the interior of the base part 18 as best shown in FIG. 1. A self-tapping screw 28 extends through a hole in the underside of the base part 18 to engage with the boss 26 to retain the bracket part 22 on the base part 18.

The planar part 24 extends into an opening 30 which in use locates forward of the dog guard 12. The bracket part 22 is profiled around the opening 30 so as to provide a curved lower surface 32 which engages against the curved side of the base part 18. A concave curved contact surface 34 is provided on the upper side of the bracket part 22 surrounding the opening 30.

Figure 8:
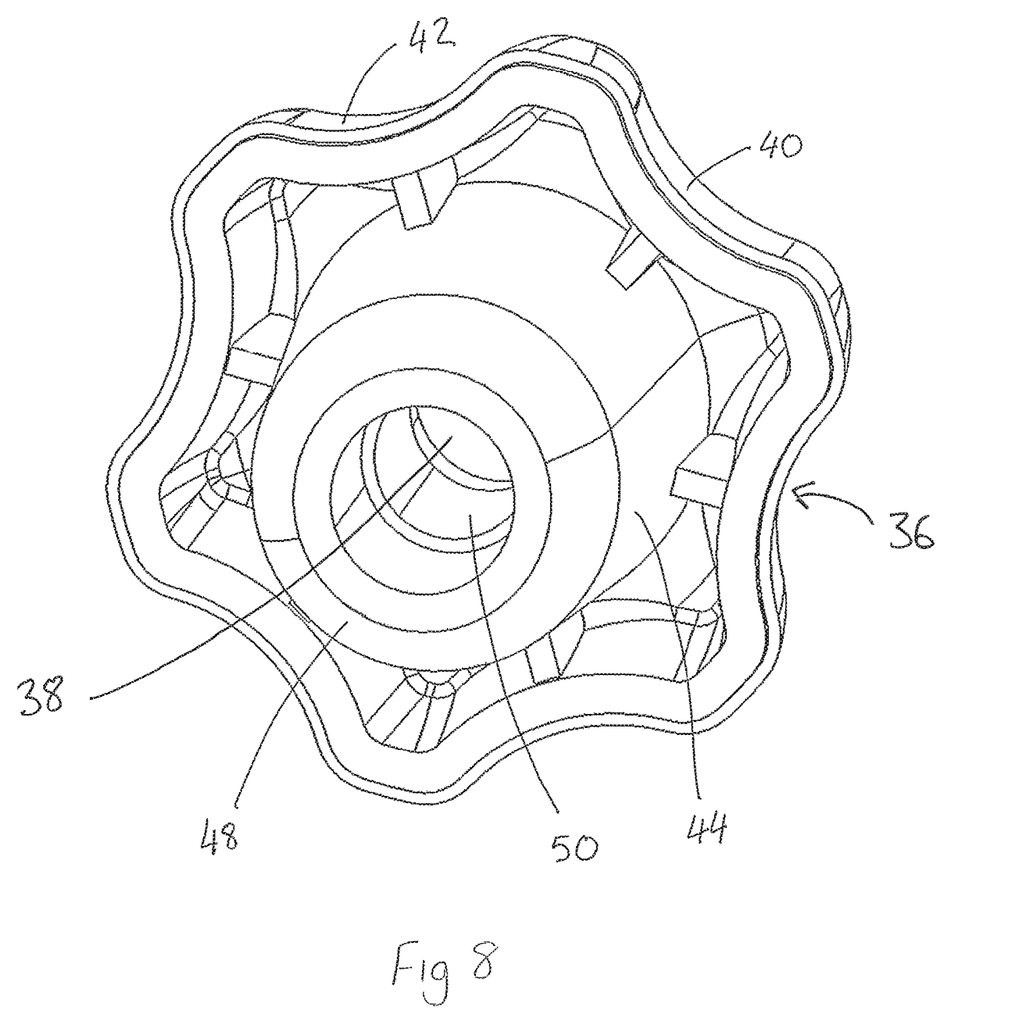
FIG. 8 is a diagrammatic perspective view from beneath of a further component of the arrangement of FIG. 1.
Figure 9:
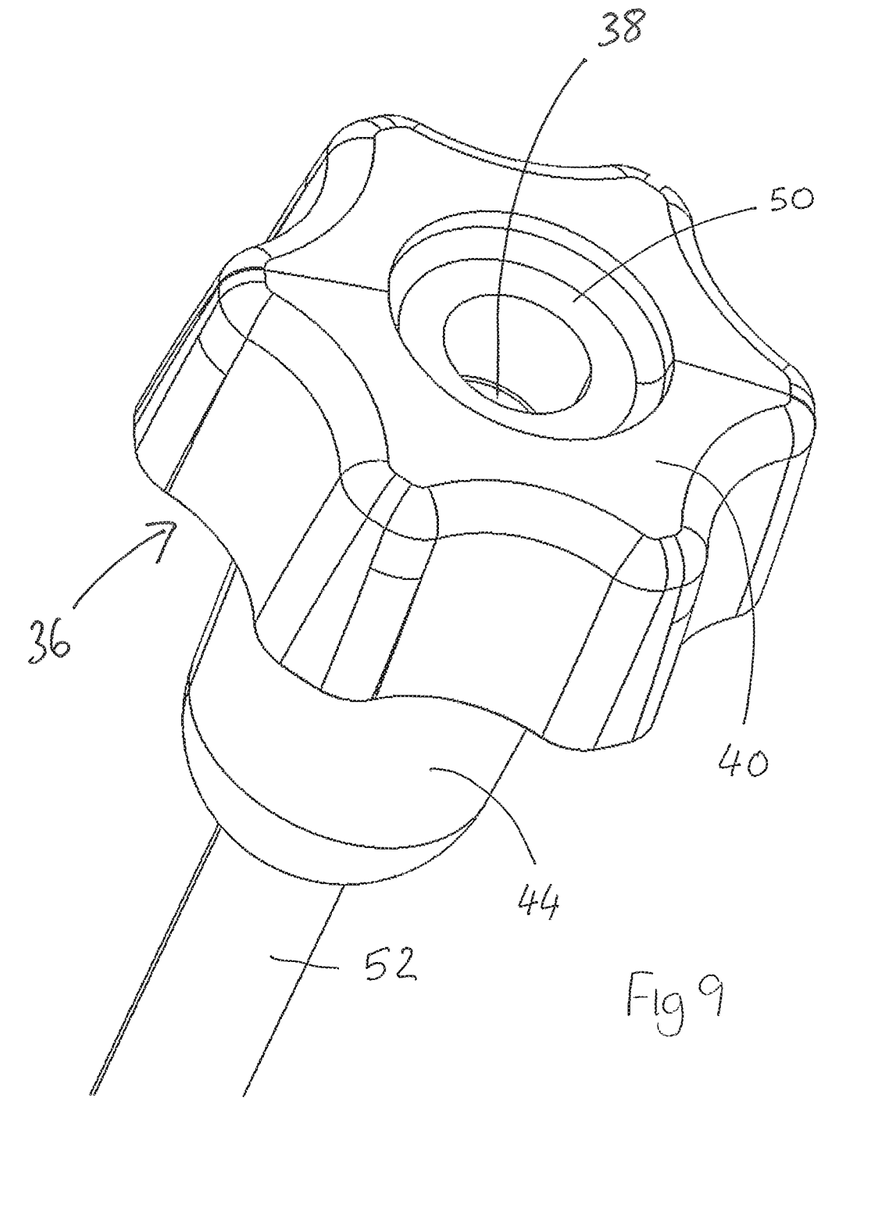
FIG. 9 is a diagrammatic perspective view from above of the component of FIG. 8 and a further component.

The mounting arrangement 10 also includes a fixing member 36 as shown for instance in FIG. 8. The fixing member 36 is again in the form of a profiled plastics material moulding. The fixing member 36 has a through hole 38 and a profiled head 40 with six circumferential concave recesses 42 to facilitate manual rotation of the head 40. A profiled sleeve 44 extends downwardly from the head 40 and surrounding the through hole 38. The sleeve 44 has a lower convex annular contact surface 48 which is engageable against the bracket part contact surface 34 to provide a ball and socket configuration. A threaded insert 50 is provided in an upper part of the sleeve 44.

The arrangement 10 also comprises an elongate member in the form of a bar 52 which is provided with a thread at least at its upper end in use, which thread is engageable with the threaded insert 50 of the fixing member 36. The bar 52 may be of variable length and could for instance be telescopic.

Figure 10:
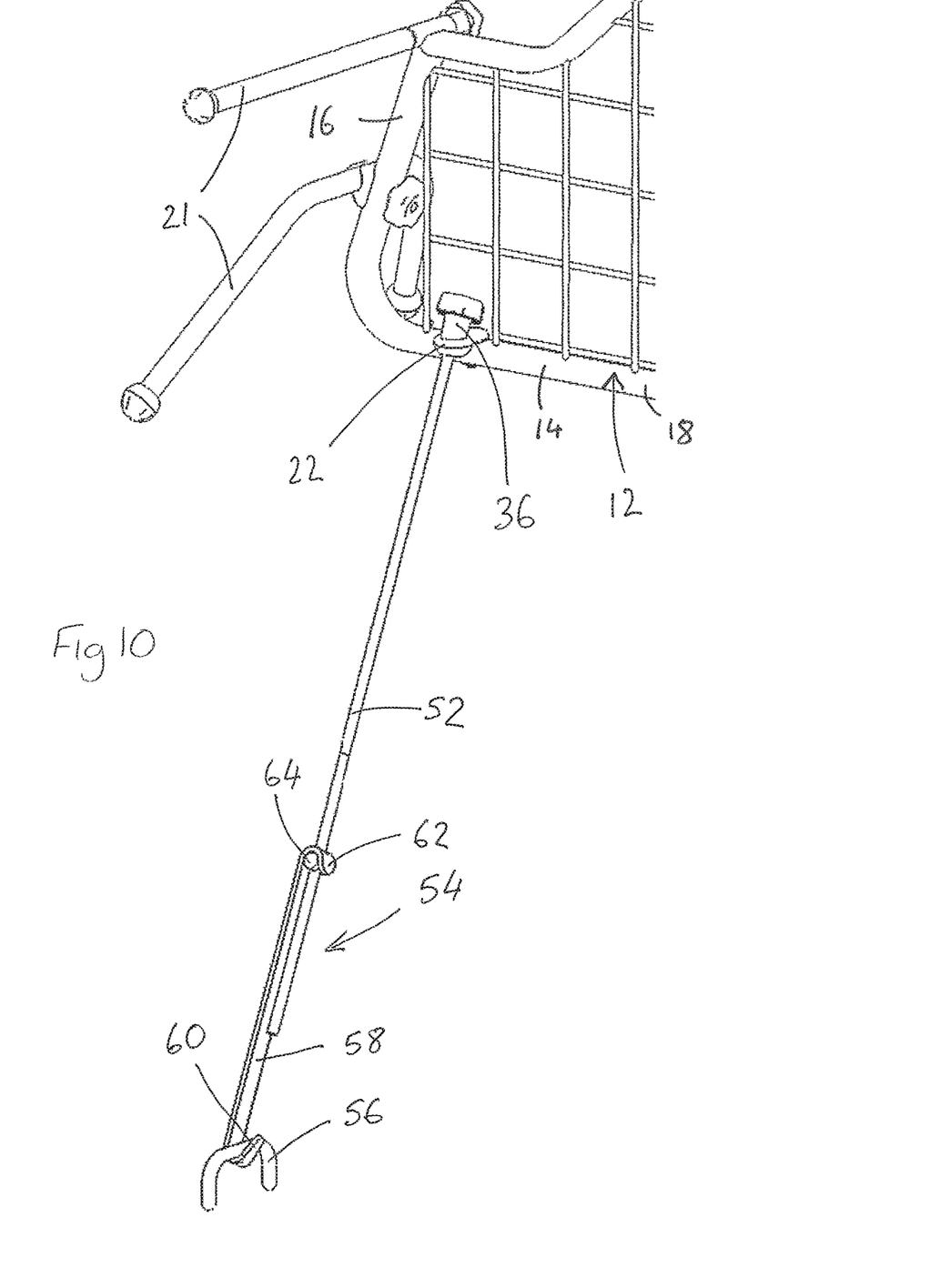
FIGS. 10 and 11 are diagrammatic perspective views of the arrangement of FIG. 1 in use in a first configuration.
Figure 11:
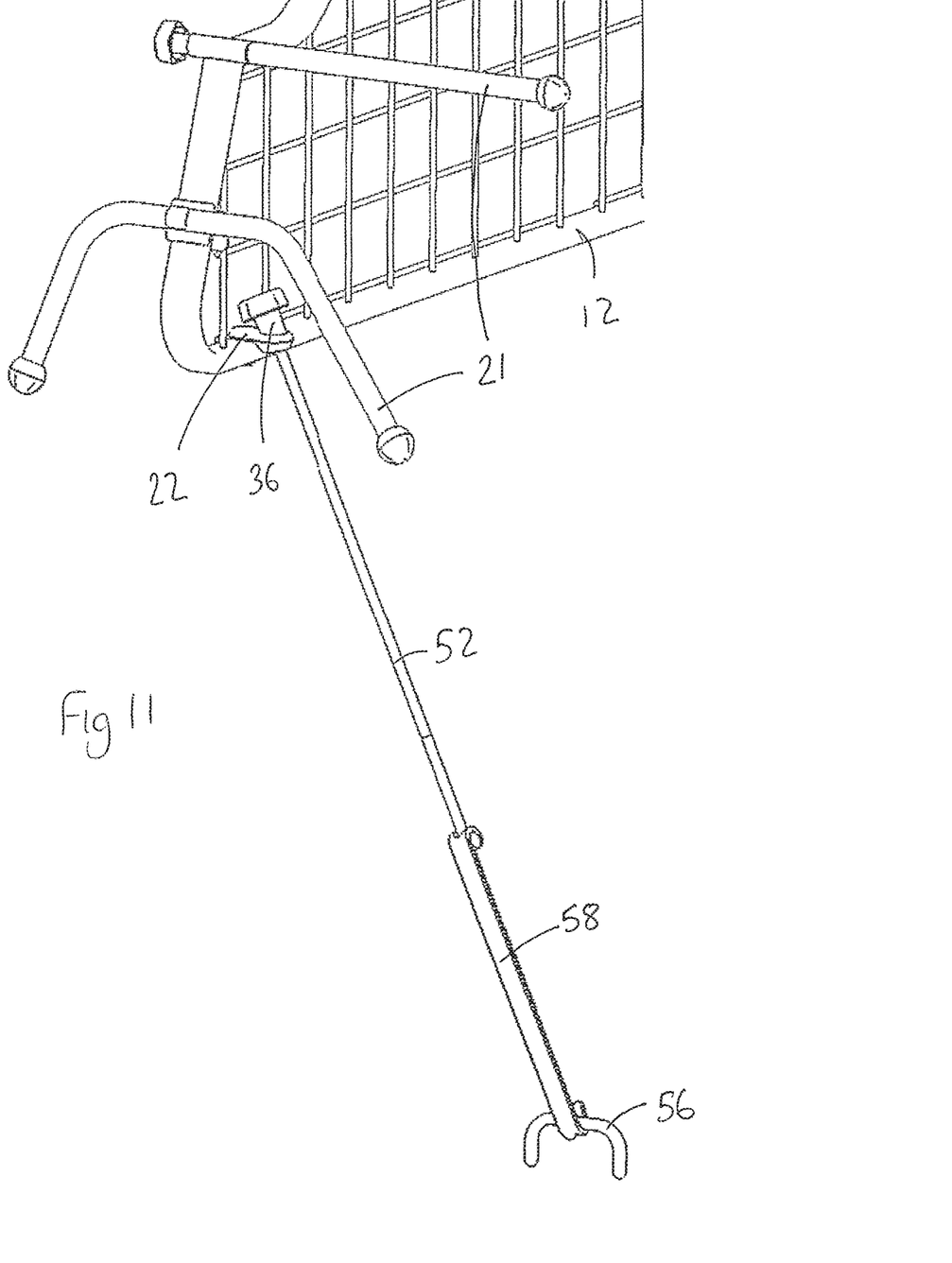

In FIGS. 10 and 11 a first fixing part 54 is provided at a lower end of the bar 52 for engaging with a fixing hook provided for instance on the floor of the boot of a car. In this configuration a further elongate member 58 is provided with a hook 60 at its lower end engageable with the vehicle fixing hook 56 and an upper hook 62 which has a through hole, and against which a projection 64 on the lower part of the bar 52 engages. The projection 64 is threadably mounted on the bar 52, such that its position thereon can be adjusted as required.

Figure 12:
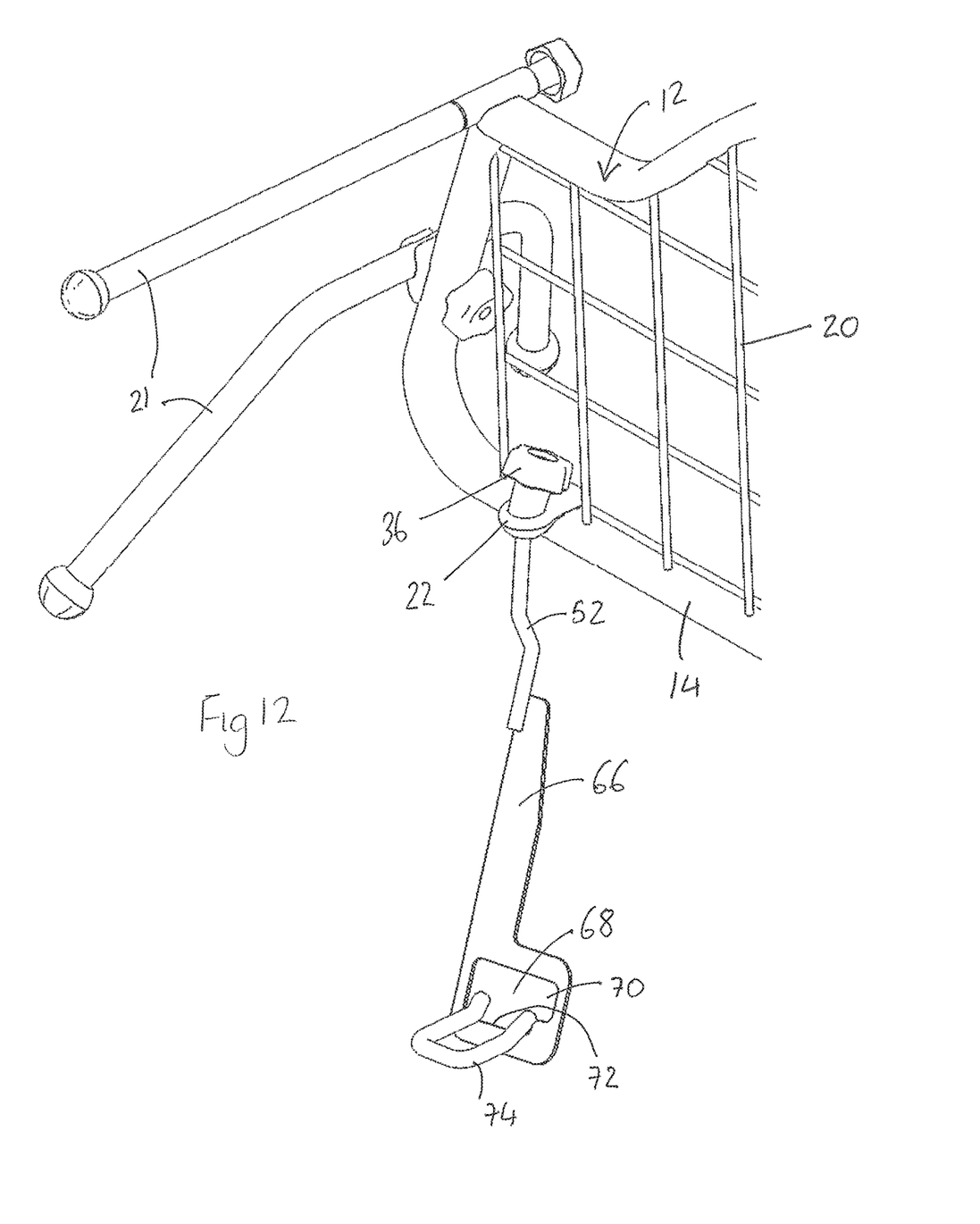
FIG. 12 is a diagrammatic perspective view of the arrangement of FIG. 1 in use in a second configuration.

In FIG. 12 a profiled bracket 66 is provided at the lower end of the bar 52. The profiled bracket 66 has a through opening 68 with an upper wider portion 70 and a lower narrower portion 72. In FIG. 12 the profiled bracket 66 is shown engaging with a seat back latch 74, with the latch 74 locating in the lower portion 72 of the opening 68.

In use the bracket part 22 will be mounted on the base part 18 as required using a self-tapping or thread rolling screw 28. The bar 52 can be mounted to an appropriate fixing hook 56 or latch 74 as appropriate for a particular vehicle. With the seat back latch 74, it may be necessary to lower the respective seat to engage a profiled bracket 66 thereon.

The upper end of the bar 52 is located to extend through the opening 30. The fixing member 36 is then threaded onto the top end of the bar 52, and tightened so as to secure the dog guard 12 in position. The provision of the contact surfaces 34, 48 means that the bar 52 can be aligned as required relative to the bracket part 22 as is required by the location of the respective mountings in the boot. The fixing member 36 can readily be loosened on the bar if it is required to remove the dog guard 12 from the vehicle.

There is thus described a mounting arrangement which is usable in a wide range of different vehicles, with different fixings, locations and orientations of fixings in the boot. Whilst described in relation to a dog guard, the mounting arrangement can be used with a cargo barrier or other structure. Accordingly the same arrangement can be used for many different vehicles in contrast to prior arrangements. The arrangement can readily be fitted, and removed as required. The arrangement is of relatively straightforward construction and can thus be inexpensive produced.

A wide range of modifications may be made without departing from the scope of the invention. For instance the bar may take a different form, and may include a different mounting arrangement dependent on the hooks or other formations in a vehicle. The mounting arrangement could be mounted on a dog guard or other structure in a different manner.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A mounting arrangement for mounting an item to a fixture, the mounting arrangement comprising:
    a bracket part mountable to the item, the bracket part including an opening through which an end of an elongate member can extend, with an additional end of the elongate member mountable to the fixture, the bracket part including a curved at least generally concave contact surface surrounding an upper end in use of the opening; and
    a fixing member engageable with the elongate member, the fixing member having a profile head with a plurality of circumferential recesses to facilitate manual rotation of the profile head, and a curved at least generally convex contact surface engageable against a contact surface of the bracket part in a ball and socket configuration, such that a relative alignment between the bracket part and the fixing member that is engageable with the elongate member is variable.

2. The mounting arrangement according to claim 1, wherein the fixing member is threaded so as to be threadingly engageable with the elongate member.

3. The mounting arrangement according to claim 1, wherein a through opening is provided in the fixing member through which an end of the elongate member is extendable.

4. The mounting arrangement according to claim 3, wherein at least part of the through opening is threaded.

5. The mounting arrangement according to claim 1, wherein the mounting arrangement includes an elongate member.

6. The mounting arrangement according to claim 5, wherein the elongate member is in a form of a bar that is threaded at least at one end.

7. The mounting arrangement according to claim 5, wherein the elongate member is variable in length.

8. The mounting arrangement according to claim 5, wherein the elongate member has a threaded first end.

9. The mounting arrangement according to claim 5, wherein the elongate member has a formation on a second end.

10. The mounting arrangement according to claim 9, wherein the formation on the second end is engageable with an additional formation, an additional structure or an additional item.

11. The mounting arrangement according to claim 10, wherein the formation on the second end comprises a hook.

12. The mounting arrangement according to claim 10, wherein the formation on the second end includes an opening for an extension of an additional formation or an additional item.

13. The mounting arrangement according to claim 1, wherein the bracket part includes a mounting part locatable in an opening or a recess in the item to mount the bracket part on the item.

14. The mounting arrangement according to claim 13, wherein the mounting arrangement further comprises a fastener.

15. The mounting arrangement according to claim 14, wherein the fastener is engageable with the mounting part to retain the mounting arrangement on the item.

16. The mounting arrangement according to claim 15, wherein the fastener comprises a self-tapping or thread rolling screw.

17. The mounting arrangement according to claim 1, wherein the item is a dog guard and the fixture is located on a vehicle.

* * * * *